United States Patent
Hara et al.

(10) Patent No.: US 11,239,457 B2
(45) Date of Patent: Feb. 1, 2022

(54) NONAQUEOUS ELECTROLYTE BATTERY AND BATTERY PACK COMPRISING A SPINEL TYPE LITHIUM-MANGANESE COMPOSITE OXIDE

(71) Applicants: KABUSHIKI KAISHA TOSHIBA, Minato-ku (JP); Toshiba Infrastructure Systems & Solutions Corporation, Kawasaki (JP)

(72) Inventors: Ryo Hara, Kashiwazaki (JP); Dai Yamamoto, Kashiwazaki (JP); Kazuhiro Namba, Kashiwazaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 166 days.

(21) Appl. No.: 16/361,968

(22) Filed: Mar. 22, 2019

(65) Prior Publication Data

US 2019/0221834 A1 Jul. 18, 2019

Related U.S. Application Data

(63) Continuation of application No. PCT/JP2017/034791, filed on Sep. 26, 2017.

(30) Foreign Application Priority Data

Sep. 29, 2016 (JP) .............................. JP2016-191759

(51) Int. Cl.
*H01M 4/525* (2010.01)
*H01M 4/505* (2010.01)
(Continued)

(52) U.S. Cl.
CPC ......... *H01M 4/1315* (2013.01); *H01M 4/131* (2013.01); *H01M 4/36* (2013.01);
(Continued)

(58) Field of Classification Search
CPC ...... H01M 4/1315; H01M 4/131; H01M 4/36; H01M 4/485; H01M 4/525; H01M 4/505;
(Continued)

(56) References Cited

U.S. PATENT DOCUMENTS 6,534,216 B1 3/2003 Narukawa et al.
2009/0289218 A1* 11/2009 Kajiya .................. H01M 4/505
252/182.1

(Continued)

FOREIGN PATENT DOCUMENTS

CN 105917515 A 8/2016
JP 11-16141 1/1999
(Continued)

OTHER PUBLICATIONS

Machine translation of JP 2015-060656, Saruwatari et al., 2015 (Year: 2015).*

(Continued)

*Primary Examiner* — Kwang Han
(74) *Attorney, Agent, or Firm* — Oblon, McClelland, Maier & Neustadt, L.L.P.

(57) ABSTRACT

According to one embodiment, provided is a nonaqueous electrolyte battery including a positive electrode, a negative electrode, and a nonaqueous electrolyte. The positive electrode includes a spinel type lithium-manganese composite oxide and a lithium cobalt oxide, which satisfy formula (1): $0.01 \leq B/(A+B) < 0.05$. The negative electrode includes a titanium-containing oxide. The nonaqueous electrolyte battery satisfies formula (2): $0.3 \leq C/D\ 0.8$. A is a weight ratio (wt %) of the spinel type lithium-manganese composite oxide. B is
(Continued)

a weight ratio (wt %) of the lithium cobalt oxide. C is a pore specific surface area (m$^2$/g) of the positive electrode. D is a pore specific surface area (m$^2$/g) of the negative electrode.

12 Claims, 4 Drawing Sheets

(51) Int. Cl.
*H01M 10/0525* (2010.01)
*H01M 4/131* (2010.01)
*H01M 4/36* (2006.01)
*H01M 4/485* (2010.01)
*H01M 4/1315* (2010.01)

(52) U.S. Cl.
CPC .......... *H01M 4/485* (2013.01); *H01M 4/505* (2013.01); *H01M 4/525* (2013.01); *H01M 10/0525* (2013.01); *Y02E 60/10* (2013.01); *Y02T 10/70* (2013.01)

(58) Field of Classification Search
CPC ....... H01M 10/0525; H01M 2004/021; H01M 4/483; H01M 4/364; Y02E 60/10; Y02T 10/70
See application file for complete search history.

(56) References Cited

U.S. PATENT DOCUMENTS

| | | |
|---|---|---|
| 2012/0270093 A1 | 10/2012 | Isozaki et al. |
| 2016/0126547 A1 | 5/2016 | Koga et al. |
| 2016/0204417 A1 | 7/2016 | Yamamoto et al. |
| 2016/0351891 A1 | 12/2016 | Sawada et al. |
| 2018/0034053 A1* | 2/2018 | Takaoka .................. H01M 4/36 |

FOREIGN PATENT DOCUMENTS

| | | | |
|---|---|---|---|
| JP | 3754218 B2 | 3/2006 | |
| JP | 2014-60009 | 4/2014 | |
| JP | 5492287 B2 | 5/2014 | |
| JP | 2015-060656 * | 3/2015 | .............. H01M 2/10 |
| JP | 2015-60656 | 3/2015 | |
| WO | WO 2011/089697 A1 | 7/2011 | |
| WO | WO 2012/023501 A1 | 2/2012 | |
| WO | WO 2014/077231 A1 | 5/2014 | |
| WO | WO 2015/107832 A1 | 7/2015 | |
| WO | WO 2016/113862 A1 | 7/2016 | |
| WO | WO 2016/129527 * | 8/2016 | ........ H01M 10/0525 |
| WO | WO 2016/129527 A1 | 8/2016 | |

OTHER PUBLICATIONS

International Search Report dated Nov. 7, 2017 in PCT/JP2017/034791 filed Sep. 26, 2017 (with English Translation).

Written Opinion dated Nov. 7, 2017 in PCT/JP2017/034791 filed Sep. 26, 2017.

Genji Jinbo, et al., "Handbook of Fine Particles", Published by Asakura Shoten, Sep. 1991, 9 pages (with English Translation).

Sohachiro Hayakawa, "Powder property Measuring Method", Published by Asakura Shoten, Oct. 1973, 9 pages (with English Translation).

* cited by examiner

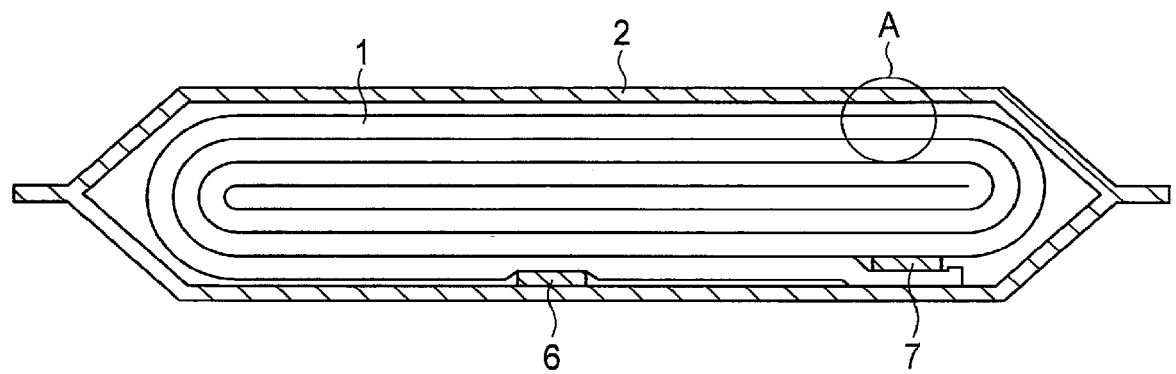
F I G. 1
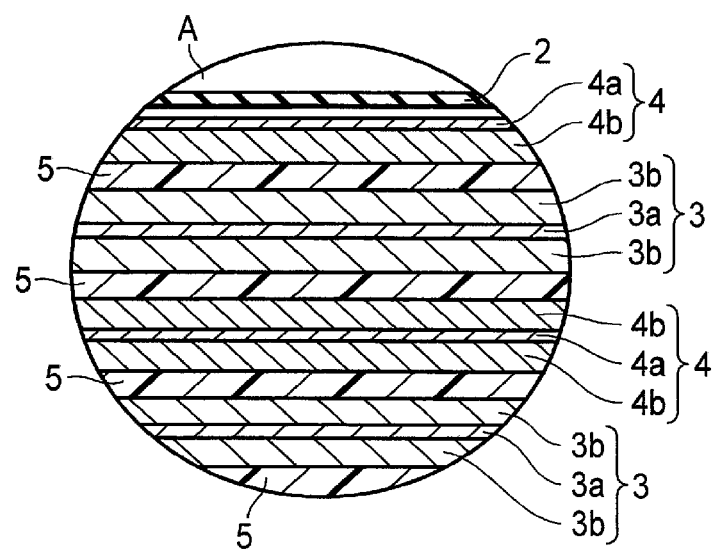
F I G. 2

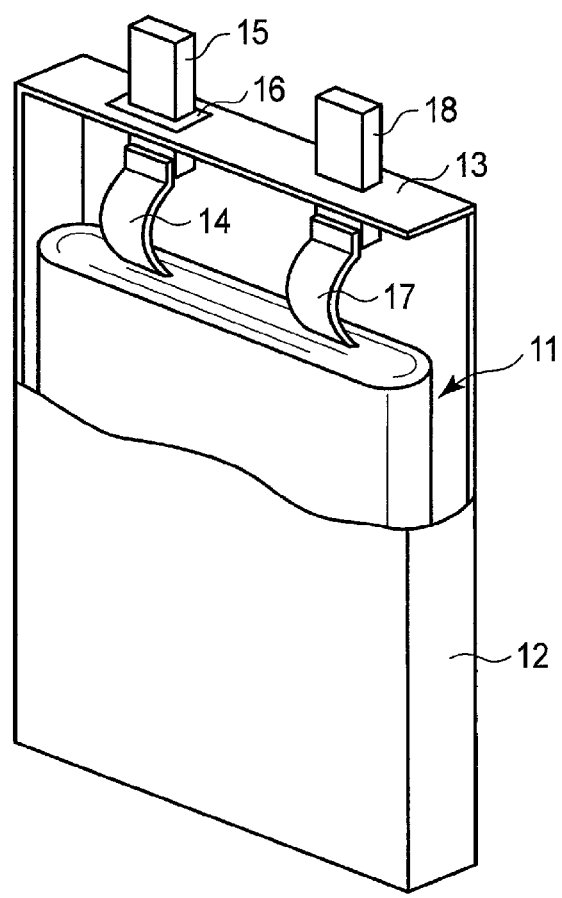
F I G. 3

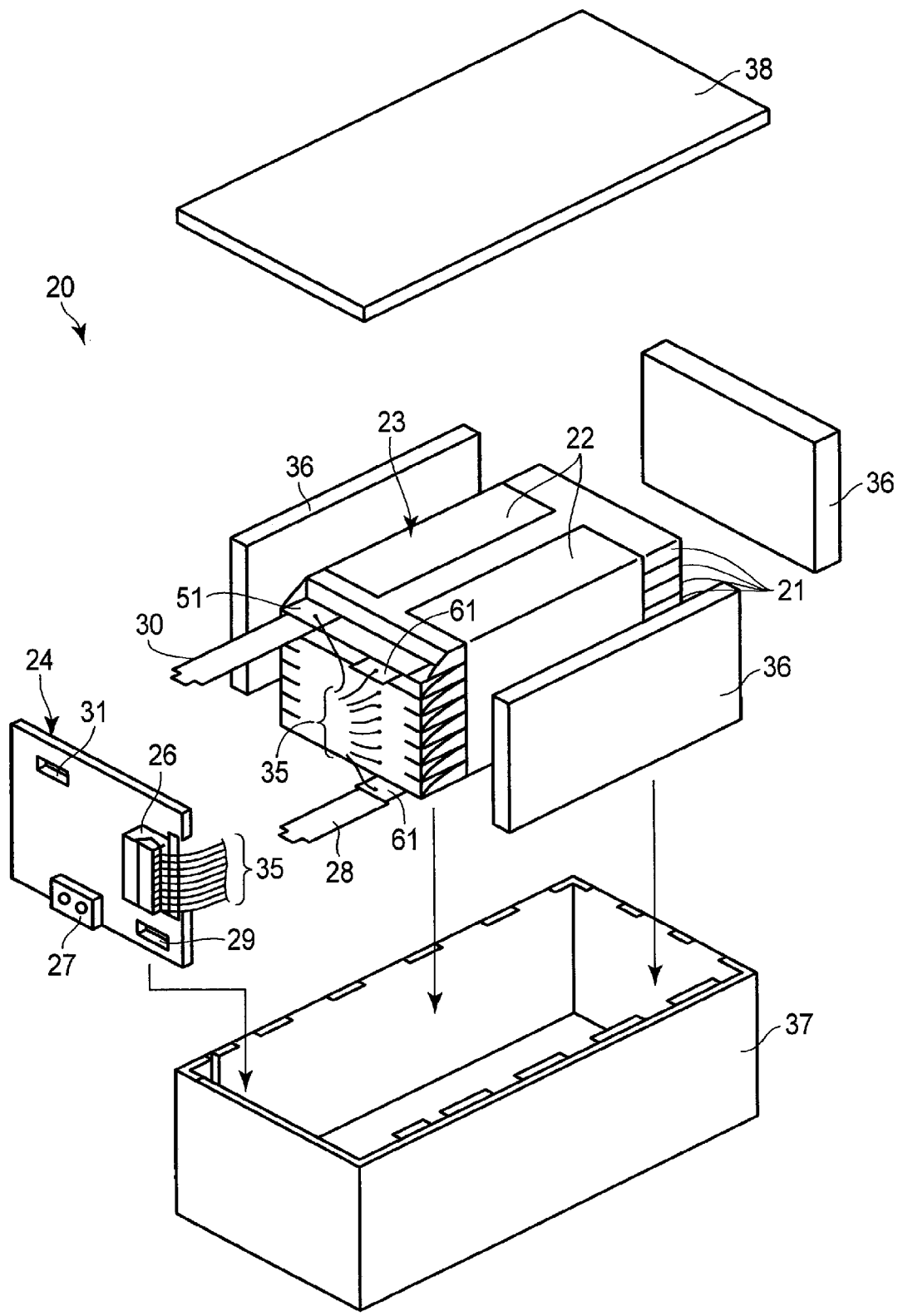
F I G. 4

NONAQUEOUS ELECTROLYTE BATTERY AND BATTERY PACK COMPRISING A SPINEL TYPE LITHIUM-MANGANESE COMPOSITE OXIDE

CROSS-REFERENCE TO RELATED APPLICATION

This application is a Continuation Application of prior International Application No. PCT/JP2017/034791, filed Sep. 26, 2017 and based upon and claiming the benefit of priority from prior Japanese Patent Application No. 2016-191759, filed Sep. 29, 2016, the entire contents of all of which are incorporated herein by reference.

FIELD

Embodiments of the present invention generally relate to a nonaqueous electrolyte battery and a battery pack.

BACKGROUND

A nonaqueous electrolyte battery, typified by a lithium-ion battery in which lithium ions serve to transfer charges, has been widely applied to uses from small-scale use such as portable electronic devices to large-scale use such as electric automobiles and electric power supply adjustment by taking advantage of being able to obtain high energy density and high output. As nonaqueous electrolyte batteries, there have been commercialized many batteries in which a lithium transition metal composite oxide such as lithium cobalt oxide ($LiCoO_2$), lithium nickel oxide ($LiNiO_2$), or lithium manganese oxide ($LiMn_2O_4$) is used as a positive electrode active material, and a carbon material is used as a negative electrode active material.

There has also been put to practical use a nonaqueous electrolyte battery using a lithium-titanium composite oxide with a high lithium insertion and extraction potential of about 1.55 V based on a lithium electrode instead of using a carbon material, as the negative electrode active material. The lithium-titanium composite oxide has excellent cycle performance because a change in its volume accompanying charge and discharge is small. Further, no lithium metal is precipitated in a negative electrode containing the lithium-titanium composite oxide at the time of lithium insertion and extraction, so that a secondary battery provided with this negative electrode can be charged with a large current.

Regarding the positive electrode active material, as an alternative material for lithium cobalt oxide ($LiCoO_2$), lithium manganese oxide ($LiMn_2O_4$) has been considered due to its advantages of being an abundant resource, being inexpensive, having little environmental burden and having high safety in an over-charged state. On the other hand, the improvement of deterioration in lithium manganese oxide under high-temperature environment has been an issue.

An attempt has also been made to inhibit self-discharge of the nonaqueous electrolyte battery by adding lithium cobalt oxide to spinel type lithium manganese oxide to alleviate an oxidant action of the spinel type lithium manganese oxide by the lithium cobalt oxide.

BRIEF DESCRIPTION OF THE DRAWINGS

FIG. 1 is a sectional view of a nonaqueous electrolyte battery, cut in a thickness direction, of a first example according to a first embodiment;

FIG. 2 is an enlarged sectional view of a portion A of FIG. 1;

FIG. 3 is a partially cutaway perspective view of a nonaqueous electrolyte battery of a second example according to the first embodiment;

FIG. 4 is an exploded perspective view of a battery pack of an example according to a second embodiment.

DETAILED DESCRIPTION

Figure 5:
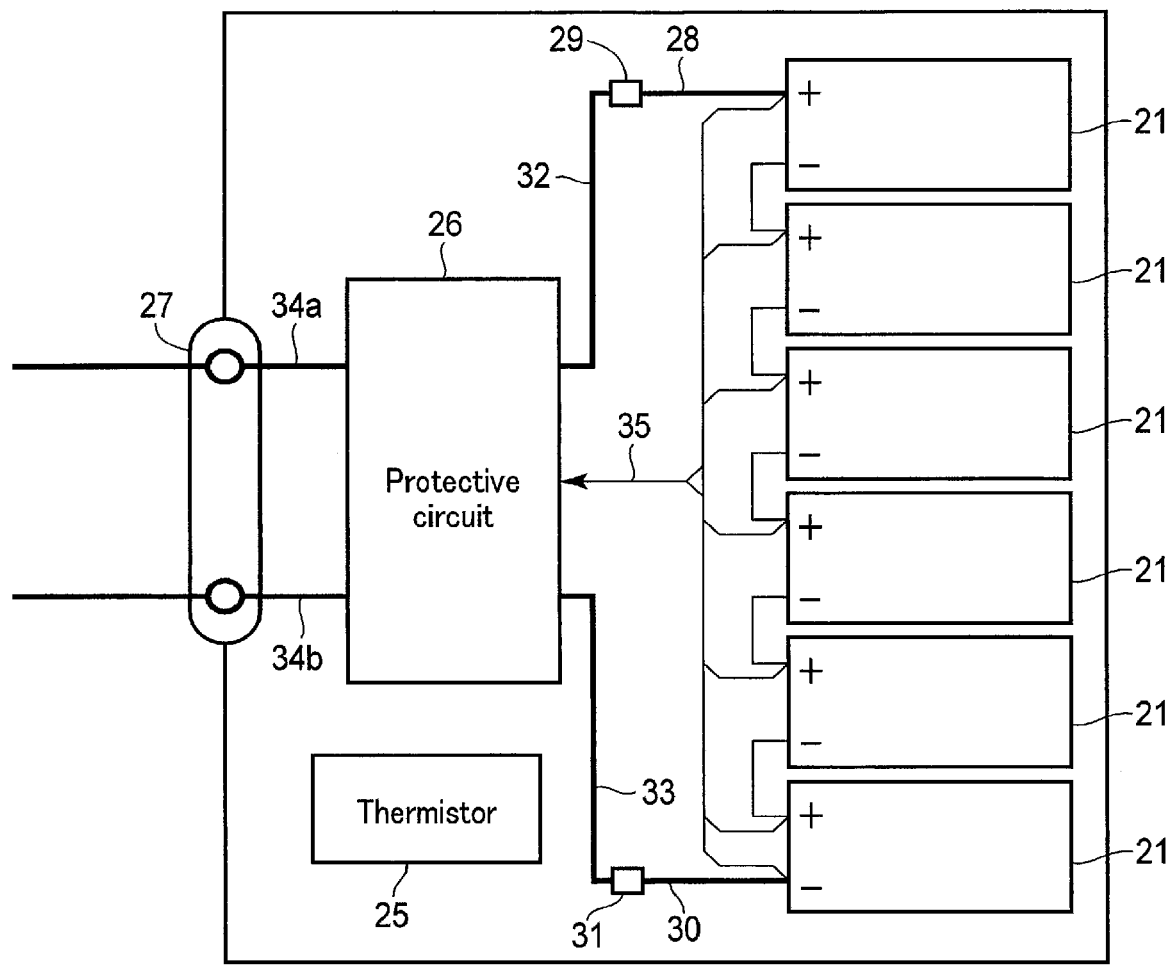
FIG. 5 is a block diagram showing an electric circuit of the battery pack shown in FIG. 4.

According to one embodiment, provided is a nonaqueous electrolyte battery including a positive electrode, a negative electrode, and a nonaqueous electrolyte. The positive electrode includes a spinel type lithium-manganese composite oxide and a lithium cobalt oxide as a positive electrode active material, the spinel type lithium-manganese composite oxide and the lithium cobalt oxide satisfying formula (1) below. The negative electrode includes a titanium-containing oxide. The nonaqueous electrolyte battery satisfies formula (2) below.

$$0.01 \leq B/(A+B) < 0.05 \quad (1)$$

$$0.3 \leq C/D \leq 0.8 \quad (2)$$

Here, A is a weight ratio (wt %) of the spinel type lithium-manganese composite oxide in the positive electrode active material, B is a weight ratio (wt %) of the lithium cobalt oxide in the positive electrode active material, C is a pore specific surface area ($m^2/g$) of the positive electrode according to mercury porosimetry, and D is a pore specific surface area ($m^2/g$) of the negative electrode according to mercury porosimetry.

In addition, according to one embodiment, a battery pack is provided. The battery pack includes the nonaqueous electrolyte battery according to the embodiment.

First Embodiment

According to an embodiment, there is provided a nonaqueous electrolyte battery including a positive electrode, a negative electrode, and a nonaqueous electrolyte. The positive electrode contains a spinel type lithium-manganese composite oxide and a lithium cobalt oxide as a positive electrode active material. The positive electrode active material satisfies the following formula (1). The negative electrode contains a titanium-containing oxide. In addition, the nonaqueous electrolyte battery satisfies the following formula (2).

$$0.01 \leq B/(A+B) < 0.05 \quad (1)$$

$$0.3 \leq C/D \leq 0.8 \quad (2)$$

where A is a weight ratio (wt %) of the spinel type lithium-manganese composite oxide in the positive electrode active material, B is a weight ratio (wt %) of the lithium cobalt oxide in the positive electrode active material, C is a pore specific surface area ($m^2/g$) of the positive electrode according to mercury porosimetry, and D is a pore specific surface area ($m^2/g$) of the negative electrode according to mercury porosimetry.

Due to its action as a strong oxidant, the spinel type lithium-manganese composite oxide is known to react with an electrolyte solution or an electrolyte salt to generate a large amount of gas. On the other hand, lithium cobalt oxide has a function as a buffer against the oxidant action of spinel type lithium manganese oxide. The present inventors have found for the first time that, when the formulas (1) and (2) described are satisfied in a nonaqueous electrolyte battery including a positive electrode that contains a positive electrode active material mainly including a spinel type lithium-manganese composite oxide and a negative electrode containing a titanium-containing oxide, generation of gas such as hydrogen gas or carbon monoxide due to a side reaction on the surface of the negative electrode is inhibited while oxidative decomposition of the nonaqueous electrolyte by the spinel type lithium-manganese composite oxide is inhibited. When the formulas (1) and (2) are satisfied, gas generated from the negative electrode can be consumed at the positive electrode by the oxidant action. Although the oxidant action of the positive electrode is a factor of oxidative decomposition of the nonaqueous electrolyte, when the formulas (1) and (2) are satisfied, the oxidative decomposition of the nonaqueous electrolyte is inhibited, and the storage performance at high temperature can be made excellent. Therefore, it is possible to achieve a nonaqueous electrolyte battery having a small gas generation amount and excellent storage performance at high temperature. As the high-temperature storage performance is improved, the gas generation during high-temperature storage is inhibited, so that the life performance of the nonaqueous electrolyte battery is also improved.

Hereinafter, the formulas (1) and (2) will be described.

When the value of B/(A+B) is below 0.01, the effect of reducing the oxidant action of the spinel type lithium-manganese composite oxide by lithium cobalt oxide becomes insufficient, therefore storage performance at high temperature becomes reduced. On the other hand, when the value of B/(A+B) is 0.05 or higher, the oxidant action of the spinel type lithium-manganese composite oxide becomes weak, thus the gas generated from the negative electrode is not consumed at the positive electrode, and the gas generation amount of the battery increases. A more preferable range of the value of B/(A+B) is 0.03 or greater and less than 0.05.

When the value of C/D is less than 0.3, the gas generated from the negative electrode cannot be sufficiently absorbed at the positive electrode, and the gas generation amount of the battery increases. On the other hand, when the value of C/D exceeds 0.8, the input/output performance of the battery deteriorates. A more preferable range of the value of C/D is from 0.3 to 0.5.

It is desirable that the pore specific surface area D of the negative electrode by the mercury porosimetry be in the range of from 5 m$^2$/g to 6 m$^2$/g. Thereby, the input and output performance of the battery can be improved. Also, it is desirable to set the pore specific surface area (m$^2$/g) C of the positive electrode by the mercury porosimetry in the range of from 1.5 m$^2$/g to 3 m$^2$/g. Thereby, the gas generation amount of the battery can further be reduced.

It is desirable that the spinel type lithium-manganese composite oxide is one represented by a general formula $LiM_xMn_{2-x}O_4$ (M is at least one element selected from the group consisting of Mg, Ti, Cr, Fe, Co, Zn, Al, Li and Ga, and x satisfies 0.22≤x≤0.7). On the other hand, lithium cobalt oxide is desirably represented by $Li_xCoO_2$ (0<x≤1.1).

The particles of the spinel type lithium-manganese composite oxide may be either primary particles or secondary particles in which primary particles are agglomerated, but it is desirable that the particles contain secondary particles. It is desirable that an average particle size (secondary particle size) of the spinel type lithium-manganese composite oxide is from 4 μm to 15 μm. A specific surface area of the particles of the spinel type lithium-manganese composite oxide, according to a BET method with N2 adsorption, is preferably from 0.1 m$^2$/g to 1.2 m$^2$/g.

When the particles of the spinel type lithium-manganese composite oxide contain secondary particles, the pore specific surface area of the positive electrode and the contact area between the spinel type lithium-manganese composite oxide and lithium cobalt oxide tend to be in an appropriate range, and the effect of improving the high-temperature storage performance of the battery can be easily obtained. In addition, high-rate charge/discharge performance can be improved.

When the average particle size of the secondary particles of the spinel type lithium-manganese composite oxide is large, the primary particles inside the secondary particles are less likely to be subjected to the buffering action of lithium cobalt oxide, and the gas generation in the battery tends to increase. However, when the average particle size is excessively small, a side reaction with the nonaqueous electrolyte becomes significant in proportion to the increase in the specific surface area of the spinel type lithium-manganese composite oxide, and in this case as well, the gas generation in the battery tends to increase. It is desirable that the average secondary particle size is 4 μm or greater and less than 10 μm.

A more preferable range of the specific surface area is greater than 0.4 m$^2$/g and 1.2 m$^2$/g or less. By setting the average secondary particle size to 4 μm or greater and less than 10 μm and simultaneously setting the specific surface area to greater than 0.4 m$^2$/g and 1.2 m$^2$/g or less, the effect of reducing the gas generation amount and improving the high-temperature storage performance can be further easily obtained.

The particles of lithium cobalt oxide may be either primary particles or secondary particles in which primary particles are agglomerated, but it is desirable that the particles mainly contain primary particles. The average particle size of the primary particles of lithium cobalt oxide particles is preferably from 6 μm to 12 μm. Further, the specific surface area according to the BET method with $N_2$ adsorption of particles of lithium cobalt oxide is preferably from 0.1 m$^2$/g to 0.6 m$^2$/g.

By setting the average particle size and the specific surface area of the spinel type lithium-manganese composite oxide particles and lithium cobalt oxide particles in the above ranges, the pore specific surface area of the positive electrode can be easily controlled to be in the range of the formula (2), and the effect of inhibiting the gas generation or the effect of improving the high-temperature storage performance can be more easily obtained.

Next, a method for measuring the weight ratio of the positive electrode active material shown by A and B in formula (1) and the pore specific surface area by mercury porosimetry shown by C and D in formula (2) will be described.

A battery is discharged and disassembled in a glove box in an argon atmosphere, and a positive electrode is taken out. The positive electrode is washed with dimethyl carbonate and then dried in vacuum. Powder is taken from a positive electrode material layer on a current collector as a measurement sample by using a spatula or the like. The obtained powder is washed with acetone and dried. After the obtained powder is dissolved with hydrochloric acid and an electroconductive agent is removed by filtration, dilution is performed with ion exchanged water, and a contained metal ratio is calculated according to inductively coupled plasma emission spectroscopy. At the same time, the presence of spinel type lithium-manganese composite oxide and lithium cobalt oxide is examined by X-ray diffraction method and SEM-EDX (Scanning Electron Microscopy-Energy Dispersive X-ray spectroscopy). From the obtained metal ratios, chemical formulas and formula weights of the spinel type lithium-manganese composite oxide and lithium cobalt oxide are calculated respectively, to obtain a weight ratio of the spinel type lithium-manganese composite oxide and lithium cobalt oxide contained in the positive electrode material layer collected in a predetermined weight. The obtained values are referred to as A and B.

Measurement of pore distribution in each of the positive electrode and the negative electrode is performed by mercury porosimetry. As a measuring apparatus, Autopore 9520, a pore distribution measuring apparatus manufactured by Shimadzu Corporation or an apparatus having a function equivalent thereto can be used. Samples are obtained by cutting the electrode into strips of about 12.5 mm×25 mm, 16 strips are sampled into a standard large-sized cell, and the samples are measured at conditions of an initial pressure of 20 kPa (corresponding to about 3 psia and a pore diameter of about 60 μm). A pore specific surface area is calculated assuming that the shape of the pore is cylindrical.

The analysis principle of the mercury porosimetry is based on the following Washburn's equation (3).

$$D = -4\gamma \cos \theta / P \quad (3)$$

where D is a pore diameter, γ is a surface tension of mercury (480 dyne·cm$^{-1}$), θ is a contact angle (140°) between mercury and the pore wall surface, and P is applied pressure. Since γ and θ are constants, the relationship between the applied pressure P and the pore diameter D is obtained from Washburn's equation (3), and by measuring a mercury penetration volume at that time, the pore diameter and its volume distribution can be derived. For details of measurement method, principle, and the like, pp. 151 to 152 in non-patent literature "Handbook of Fine Particles" written by Genji Jimbo, et al (published by Asakura Shoten (1991)), pp. 257 to 259 in non-patent Literature "Powder Property Measuring Method" edited by Sohachiro Hayakawa (published by Asakura Shoten (1973)), and the like can be referred to. In order to measure the pore distribution of the positive electrode and the negative electrode in the battery, the battery is discharged and then disassembled in a glove box in an argon atmosphere, and each of the positive electrode and the negative electrode is taken out. The taken-out electrode is washed with dimethyl carbonate and then vacuum-dried, and the pore distribution measurement is performed.

In the battery of the embodiment, in addition to the positive electrode, the negative electrode, and the nonaqueous electrolyte, a separator may be disposed between the positive electrode and the negative electrode. Further, the battery of the embodiment may further include a container member for housing these.

Hereinafter, the nonaqueous electrolyte, the positive electrode, the negative electrode, the separator, and the container member will be described.

1) Nonaqueous electrolyte

Examples of the nonaqueous electrolyte include a liquid nonaqueous electrolyte prepared by dissolving an electrolyte in a nonaqueous solvent, a gel nonaqueous electrolyte obtained by combining liquid nonaqueous electrolyte and a polymer material, and the like.

Examples of the electrolyte include lithium salts such as lithium perchlorate ($LiClO_4$), lithium hexafluorophosphate ($LiPF_6$), lithium tetrafluoroborate ($LiBF_4$), lithium arsenate hexafluoride ($LiAsF_6$), lithium difluorophosphate ($LiPO_2F_2$), lithium trifluoromethanesulfonate ($LiCF_3SO_3$), and lithium Bis[(trifluoromethyl)sulfonyl] imide[$LiN(CF_3SO_2)_2$]. These electrolytes may be used alone or in combination of two or more.

It is preferable to dissolve the electrolyte in the range of 0.5 mol/L or more and 2.5 mol/L or less with respect to an organic solvent.

Examples of the nonaqueous solvent include: cyclic carbonates such as ethylene carbonate (EC), propylene carbonate (PC), and vinylene carbonate (VC); linear carbonates such as dimethyl carbonate (DMC), ethyl methyl carbonate (EMC), and diethyl carbonate (DEC); cyclic ethers such as tetrahydrofuran (THF) and 2-methyltetrahydrofuran (2MeTHF); linear ethers such as dimethoxyethane (DME); cyclic esters such as γ-butyrolactone (BL); linear esters such as methyl acetate, ethyl acetate, methyl propionate, and ethyl propionate; acetonitrile (AN); sulfolane (SL), and the like. These organic solvents may be used alone or in the form of a mixture of two or more.

Examples of the polymer material used for the gel nonaqueous electrolyte include polyvinylidene fluoride (PVdF), polyacrylonitrile (PAN), polyethylene oxide (PEO), and the like.

2) Positive Electrode

The positive electrode includes a positive electrode current collector and a positive electrode active material containing layer (positive electrode material layer) that is supported on one surface or each of reverse surfaces of the positive electrode current collector and includes a positive electrode active material, a positive electrode electro-conductive agent, and a binder.

As described above, the positive electrode active material contains the spinel type lithium-manganese composite oxide and lithium cobalt oxide.

Examples of the binder include polytetrafluoroethylene (PTFE), polyvinylidene fluoride (PVdF), fluorine rubber, styrene butadiene rubber (SBR), carboxymethyl cellulose (CMC), polyimide, polyamide, and the like. The species of the binder may be one specie, or two species or more.

Examples of the positive electrode electro-conductive agent include carbon black such as acetylene black and Ketjen black, graphite, carbon fiber, carbon nanotube, fullerene, and the like. The species of the electro-conductive agent may be one specie, or two species or more.

A mixing ratio of the positive electrode active material, the electro-conducting agent, and the binder in the positive electrode active material containing layer is preferably set to 80 wt % or higher and 95 wt % or lower of the positive electrode active material, 3 wt % or higher and 18 wt % or lower of the electro-conductive agent, and 2 wt % or higher and 17 wt % or lower of the binder.

The current collector is preferably aluminum foil or aluminum alloy foil, and the average crystal particle size is preferably 50 μm or less, more preferably 30 μm or less, further preferably 5 μm or less. The current collector formed of aluminum foil or aluminum alloy foil having such an average crystal particle size can remarkably increase the strength, and allows the density of the positive electrode to be made high by high pressing pressure, to increase the battery capacity.

Aluminum foil or aluminum alloy foil having an average crystal particle size of 50 μm or less is complicatedly influenced by many factors such as material composition, impurities, processing conditions, heat treatment history, heating condition of annealing, and the crystal grain size (diameter) is adjusted by combining the above factors in the manufacturing process.

The thickness of the current collector is 20 μm or less, more preferably 15 μm or less. The purity of the aluminum foil is preferably 99% or higher. The aluminum alloy is preferably an alloy containing an element such as magnesium, zinc, or silicon. Meanwhile, a preferable content of each of the transition metal such as iron, copper, nickel, and chromium is 1% or less.

The positive electrode is prepared, for example, by suspending the positive electrode active material, a positive electrode electro-conductive agent, and a binder in an appropriate solvent, coating the resultant slurry onto a positive electrode current collector, and drying the slurry to prepare a positive electrode active material containing layer, and conducting a press. In addition, the positive electrode active material, the positive electrode electro-conductive agent, and the binder may be formed into pellets and used as the positive electrode active material containing layer. At the time of dispersing the slurry, when a physically excessive force is applied to the materials put in, the secondary particles of the composite oxide may become disintegrated to cause deterioration in lifetime performance. Hence, dispersion conditions should be adjusted. As an example of the adjustment, a dispersion method shown in the examples can be mentioned. Further, a drying temperature is preferably 100° C. or higher and 130° C. or lower. As a result, abrupt drying is avoided, whereupon the uneven distribution of the spinel type lithium-manganese composite oxide and lithium cobalt oxide in the electrode is inhibited, and the spinel type lithium-manganese composite oxide becomes susceptible to buffering action of lithium cobalt oxide.

The positive electrode material layer preferably has a porosity of 20% or higher and 50% or lower. The positive electrode provided with the positive electrode material layer having such porosity is high in density and excellent in affinity with the nonaqueous electrolyte. A more preferable porosity is 25% or higher and 40% or lower.

The density of the positive electrode material layer is preferably 2.5 g/cm$^3$ or higher.

3) Negative Electrode

The negative electrode includes a negative electrode current collector and a negative electrode active material containing layer (negative electrode material layer) that is supported on one surface or each of both surfaces of the negative electrode current collector and includes a negative electrode active material, a negative electrode electro-conductive agent, and a binder.

The negative electrode active material contains a titanium-containing oxide. The species of the negative electrode active material may be one specie, or two species or more.

Examples of titanium-containing oxides include lithium-titanium composite oxides, anatase-type titanium-containing oxides, rutile-type titanium-containing oxides, bronze-type titanium-containing oxides, orthorhombic titanium-containing oxides, monoclinic niobium titanium-containing oxides, and metal composite oxides containing Ti and at least one element selected from the group consisting of P, V, Sn, Cu, Ni, Nb, and Fe.

The lithium-titanium composite oxide includes lithium-titanium oxide and a lithium-titanium composite oxide obtained by substituting a part of constituent elements of lithium-titanium oxide with dopant elements. Examples of the lithium titanium oxide include lithium titanate having a spinel type structure (e.g., $Li_{4+x}Ti_5O_{12}$ (x is a value that varies with charge and discharge, $0 \leq x \leq 3$)), ramsdellite type lithium titanate (e.g., $Li_{2+y}Ti_3O_7$ (y is a value that varies with charge and discharge, $0 \leq y \leq 3$)), and the like. On the other hand, although the molar ratio of oxygen is formally shown as 12 for the spinel type $Li_{4+x}Ti_5O_{12}$ and 7 for the ramsdellite type $Li_{2+y}Ti_3O_7$, these values may become changed by the effect of oxygen nonstoichiometry or the like.

Examples of the metal composite oxide containing Ti and at least one element selected from the group consisting of P, V, Sn, Cu, Ni, Nb, and Fe include $TiO_2$—$P_2O_5$, $TiO_2$—$V_2O_5$, $TiO_2$—$P_2O_5$—$SnO_2$, and $TiO_2$—$P_2O_5$—MeO (Me is at least one element selected from the group consisting of Cu, Ni, and Fe), and the like. This metal composite oxide preferably has a microstructure with low crystallinity, where a crystal phase and an amorphous phase are coexistent, or a crystal phase is singly existent. With such a microstructure, the cycle performance can be improved by a large degree. The composition of the anatase-type, rutile-type, and bronze-type titanium-containing oxides can be represented by $TiO_2$.

Examples of the orthorhombic titanium-containing oxide include a compound represented by the general formula $Li_{2+w}Na_{2-x}M1_yTi_{6-z}M2_zO_{14+\delta}$ where M1 is Cs and/or K and M2 contains at least one of Zr, Sn, V, Nb, Ta, Mo, W, Fe, Co, Mn, and Al, and $0 \leq w \leq 4$, $0 \leq x \leq 2$, $0 \leq y \leq 2$, $0 \leq z \leq 6$, $-0.5 \leq \delta \leq 0.5$.

Examples of the monoclinic niobium titanium-containing oxide include a compound represented by the general formula $Li_xTi_{1-y}M3_yNb_{2-z}M4_zO_{7+\delta}$, where M3 is at least one selected from the group consisting of Zr, Si, Sn, Fe, Co, Mn, and Ni, and M4 is at least one selected from the group consisting of V, Nb, Ta, Mo, W, and Bi, and $0 \leq x \leq 5$, $0 \leq y \leq 1$, $0 \leq z \leq 2$, $-0.3 \leq \delta \leq 0.3$.

The preferable negative electrode active material contains the lithium-titanium composite oxide.

A negative electrode containing the titanium-containing oxide such as the lithium-titanium composite oxide has a Li insertion potential of 0.4 V (vs. Li/Li$^+$) or greater, so that it is possible to prevent precipitation of metallic lithium on the surface of the negative electrode at the time of repeated input and output at a large current. An active material other than the lithium-titanium composite oxide may be contained in the negative electrode active material, but in that case, it is desirable to use an active material having a Li insertion potential of 0.4 V (vs. Li/Li$^+$) or higher.

Examples of the binder include polytetrafluoroethylene (PTFE), polyvinylidene fluoride (PVdF), fluorine rubber, styrene butadiene rubber (SBR), carboxymethyl cellulose (CMC), polyimide, polyamide, and the like. The species of the binder may be one specie, or two species or more.

Examples of the negative electrode electro-conductive agent include carbon black such as acetylene black and Ketjen Black, graphite, carbon fiber, carbon nanotube, fullerene, and the like. The species of the electro-conductive agent may be one specie, or two species or more.

The mixing ratio of the negative electrode active material, the electro-conductive agent, and the binder in the negative electrode active material containing layer is preferably set to 70 wt % or higher and 96 wt % or lower of the negative electrode active material, 2 wt % or higher and 28 wt % or lower of the electro-conductive agent, and 2 wt % or higher and 28 wt % or lower of the binder. When the electro-conductive agent is mixed in a proportion of 2 wt % or higher, excellent high current performance due to high current collection performance can be obtained. By setting the amount of the binder to 2 wt % or higher, it is possible to increase the binding property between the negative electrode active material containing layer and the negative electrode current collector, and improve the cycle performance. On the other hand, from the viewpoint of increasing the capacity, each of the negative electrode electro-conductive agent and the binder is preferably 28 wt % or lower.

The current collector is preferably aluminum foil or aluminum alloy foil which is electrochemically stable in a potential range which is higher than 1.0V.

The negative electrode is prepared, for example, by suspending the negative electrode active material, the negative electrode electro-conductive agent, and the binder in an appropriate solvent, coating the obtained slurry onto the negative electrode current collector, and drying the slurry to prepare a negative electrode active material containing layer, and conducting a press. In addition, the negative electrode active material, the negative electrode electro-conductive agent, and the binder may be formed into pellets and used as the negative electrode active material containing layer.

The negative electrode material layer preferably has a porosity of 20% or higher and 50% or lower. The negative electrode material layer having such a porosity has excellent affinity with the nonaqueous electrolyte and can achieve high density. A more preferable porosity is 25% or higher and 40% or lower.

The density of the negative electrode material layer is preferably 2.0 g/cm$^3$ or higher.

4) Separator

Examples of the separator include a porous film, a nonwoven fabric made of synthetic resin, and the like, which contain polyethylene, polypropylene, cellulose, or polyvinylidene fluoride (PVdF).

5) Container Member

The container member may be formed of a laminate film or a metallic container. In the case of using a metallic container, the lid may be made integral with or separate from the container. The thickness of the metallic container is more preferably 0.5 mm or less, or 0.2 mm or less. Examples of the shape of the container member include a flat type, square type, cylindrical type, coin type, button type, sheet type, stacked type, and the like. Besides small batteries loaded on portable electronic devices and the like, large batteries loaded on two-wheel or four-wheel automobiles may be used.

The thickness of the laminate film-made container member is desirably 0.2 mm or less. Examples of the laminate film include a multilayer film including a resin film and a metal layer disposed between the resin film. The metal layer is preferably aluminum foil or aluminum alloy foil for weight reduction. As the resin film, for example, a polymer material such as polypropylene (PP), polyethylene (PE), nylon, or polyethylene terephthalate (PET) may be used. The laminate film can be sealed by heat sealing to be formed into the shape of the container member.

The metallic container is made of aluminum, an aluminum alloy or the like. The aluminum alloy is preferably an alloy containing an element such as magnesium, zinc, or silicon. In aluminum or aluminum alloy, the content of transition metal such as iron, copper, nickel, chromium, or the like is preferably 100 ppm or less from the viewpoint of dramatically improving long-term reliability and heat dissipation in a high temperature environment.

The metallic container made of aluminum or an aluminum alloy preferably has an average crystal particle size of 50 μm or less, more preferably 30 μm or less, further preferably 5 μm or less. By setting the average crystal particle size to 50 μm or less, it is possible to dramatically increase the strength of the metallic container made of aluminum or an aluminum alloy, and thereby further reduce the thickness of the container. As a result, it is possible to achieve a nonaqueous electrolyte battery which is lightweight, has high output, and is excellent in long-term reliability, and thus suitable for onboard use or the like.

The battery of the embodiment has a long lifetime and is excellent in safety, thus being particularly suitable for an onboard battery.

An example of a battery according to an embodiment will be described with reference to FIGS. 1 and 2. As shown in FIG. 1, a flat nonaqueous electrolyte secondary battery is provided with a flat shaped wound electrode group 1, a container member 2, a positive electrode terminal 7, a negative electrode terminal 6, and a nonaqueous electrolyte. The container member 2 is a bag-form container member made of a laminate film. The wound electrode group 1 is housed in the container member 2. As shown in FIG. 2, the wound electrode group 1 includes a positive electrode 3, a negative electrode 4, and a separator 5, and a stack obtained by stacking the negative electrode 4, the separator 5, the positive electrode 3, and the separator 5 in this order from the outside is spirally wound and subjected to press molding, to form the wound electrode group 1.

The positive electrode 3 includes a positive electrode current collector 3a and a positive electrode active material containing layer 3b. The positive electrode active material containing layer 3b contains a positive electrode active material. The positive electrode active material containing layer 3b is formed on each surface of the positive electrode current collector 3a. The negative electrode 4 includes a negative electrode current collector 4a and a negative electrode active material containing layer 4b. The negative electrode active material containing layer 4b contains a negative electrode active material. In the negative electrode 4, at the outermost layer, the negative electrode active material containing layer 4b is formed only on one surface on the inner surface side of the negative electrode current collector 4a, and in the other portions, the negative electrode active material containing layer 4b is formed on each surface of the negative electrode current collector 4a.

Further, as shown in FIG. 2, the belt-form positive electrode terminal 7 is connected to the positive electrode current collector 3a of the positive electrode 3 in the vicinity of the outer peripheral end of the wound electrode group 1. Further, the belt-form negative electrode terminal 6 is connected to the negative electrode current collector 4a of the negative electrode 4 at the outermost layer. The positive electrode terminal 7 and the negative electrode terminal 6 are extended to the outside through an opening of the container member 2. A nonaqueous electrolyte solution is further put into the container member 2 as a nonaqueous electrolyte. The openings of the container member 2 are heat-sealed with the positive electrode terminal 7 and the negative electrode terminal 6 interposed therebetween, whereby the wound electrode group 1 and the nonaqueous electrolyte are sealed.

The battery according to the embodiment is not limited to the configuration shown in FIG. 1 and FIG. 2 described above, but may be configured as shown in FIGS. 3 and 4, for example. The same members as those in FIGS. 1 and 2 are denoted by the same reference numerals, and description thereof is omitted.

In a rectangular nonaqueous electrolyte battery shown in FIG. 3, a wound electrode group 11 is stored in a metallic bottomed rectangular tubular container (container member) 12. The nonaqueous electrolyte solution (liquid nonaqueous electrolyte) is poured in from the opening of the container 12, for example, and is contained in the container 12. By welding a rectangular lid 13 to the opening of the container 12, the wound electrode group 11 and the nonaqueous electrolyte solution are sealed in the container member. The flat wound electrode group 11 is formed by winding spirally a stack obtained by stacking the negative electrode, the separator, the positive electrode, and the separator in this order, and performing press molding.

One end of a negative electrode tab 14 is electrically connected to the negative electrode current collector and the other end thereof is electrically connected to a negative electrode terminal 15. The negative electrode terminal 15 is fixed to the rectangular lid 13 by a hermetic seal with a glass material 16 interposed. One end of a positive electrode tab 17 is electrically connected to the positive electrode current collector and the other end is electrically connected to a positive electrode terminal 18 fixed to the rectangular lid 13.

The negative electrode tab 14 is made of a material such as aluminum or an aluminum alloy containing elements such as Mg, Ti, Zn, Mn, Fe, Cu, and Si, and the like. The negative electrode tab 14 is preferably formed of a similar material to that of the negative electrode current collector so as to reduce the contact resistance with the negative electrode current collector.

The positive electrode tab 17 is made of a material such as aluminum or an aluminum alloy containing elements such as Mg, Ti, Zn, Mn, Fe, Cu, and Si, and the like. The positive electrode tab 17 is preferably formed of a similar material to that of the positive electrode current collector so as to reduce the contact resistance with the positive electrode current collector.

In the illustrated nonaqueous electrolyte battery, the wound type electrode group in which the separator is wound together with the positive electrode and the negative electrode has been used, but there may be used a stacked electrode group in which a separator is folded in zigzag and positive electrode(s) and negative electrode(s) are alternately arranged at the folded portions.

According to the nonaqueous electrolyte battery of the first embodiment described above, the positive electrode containing the spinel type lithium-manganese composite oxide and lithium cobalt oxide as the active material and the negative electrode containing the titanium-containing oxide as an active material are provided, and the formulas (1) and (2) are satisfied, so that it is possible to reduce the gas generation amount within the battery, and it is thus possible to provide a nonaqueous electrolyte battery which is high in output and excellent in life performance and in which a container member hardly swells.

Second Embodiment

According to a second embodiment, a battery pack is provided. This battery pack includes the nonaqueous electrolyte battery according to the first embodiment.

The battery pack according to the second embodiment may include plural nonaqueous electrolyte batteries. The plural nonaqueous electrolyte batteries may be electrically connected in series or electrically connected in parallel. Alternatively, plural nonaqueous electrolyte batteries may be connected in a combination of series and parallel.

For example, the battery pack according to the second embodiment may be provided with five nonaqueous electrolyte batteries according to the first embodiment. These nonaqueous electrolyte batteries may be connected in series. Further, the nonaqueous electrolyte batteries connected in series may constitute a battery module. That is, the battery pack according to the second embodiment may also include a battery module.

The battery pack according to the second embodiment may include plural battery modules. The plural battery modules may be connected in series, in parallel, or in combination of series and parallel.

Hereinafter, an example of a battery pack according to the second embodiment will be described with reference to FIGS. 4 and 5.

FIG. 4 is an exploded perspective view of an example of the battery pack according to the second embodiment. FIG. 5 is a block diagram showing an electric circuit of the battery pack shown in FIG. 4.

The battery pack 20 shown in FIGS. 4 and 5 includes plural single-batteries 21. The single-battery 21 may be the exemplar flat nonaqueous electrolyte battery according to the first embodiment described with reference to FIG. 1.

The plural single-batteries 21 are stacked so that negative electrode terminals 51 and positive electrode terminals 61 extending the outside are aligned in the same direction and are fastened with an adhesive tape 22 to constitute a battery module 23. These single-batteries 21 are electrically connected in series to each other as shown in FIG. 5.

A printed wiring board 24 is disposed to face the side surface from which the negative electrode terminals 51 and the positive electrode terminals 61 of the single-batteries 21 extend. As shown in FIG. 5, the printed wiring board 24 is mounted with a thermistor 25, a protective circuit 26, and an energizing terminal 27 to external equipment. Note that an insulating plate (not shown) is attached to the surface of the printed wiring board 24 which faces the battery module 23 so as to avoid unnecessary connection with the wiring of the battery module 23.

A positive electrode side lead 28 is connected to the positive electrode terminal 61 located lowermost in the battery module 23, and its tip is inserted into a positive electrode side connector 29 of the printed wiring board 24 and electrically connected thereto. A negative electrode side lead 30 is connected to the negative electrode terminal 51 located uppermost in the battery module 23, and its tip is inserted into the negative electrode side connector 31 of the printed wiring board 24 and electrically connected thereto. These connectors 29 and 31 are connected to the protective circuit 26 through wiring 32 and the wiring 33 formed on the printed wiring board 24.

The thermistor 25 detects the temperature of the single-batteries 21, and the detection signal is transmitted to the protective circuit 26. The protective circuit 26 can shut off a plus-side wiring 34a and a minus-side wiring 34b between the protective circuit 26 and the energizing terminal 27 to external equipment in a predetermined condition. An example of the predetermined condition is, for example, when the temperature detected by the thermistor 25 becomes a predetermined temperature or higher. Further, another example of the predetermined condition is, for example, when overcharge, over-discharge, overcurrent, or the like of the single-battery 21 is detected. Detection of this overcharge or the like is performed for each of the individual single-batteries 21 or the entire battery module 23. In the case of detecting each single-battery 21, a battery voltage may be detected, or a positive electrode potential or a negative electrode potential may be detected. In the latter case, a lithium electrode used as a reference electrode is inserted into each single-battery 21. In the case of the battery pack 20 of FIG. 4 and FIG. 5, wiring 35 for voltage detection is connected to each of the single-batteries 21. Detection signals are transmitted to the protective circuit 26 through the wiring 35.

Protective sheets 36 made of rubber or resin are respectively arranged on three side surfaces of the battery module 23 excluding the side surface from which the positive electrode terminal 61 and the negative electrode terminal 51 protrude.

The battery module 23 is housed in a housing container 37 together with each protective sheet 36 and the printed wiring board 24. That is, the protective sheets 36 are disposed in the housing container 37 respectively on both inner side surfaces in a long-side direction and the inner side surface in a short-side direction, and the printed wiring board 24 is disposed on the inner side surface at the opposite side in the short-side direction. The battery module 23 is located in a space surrounded by the protective sheets 36 and the printed wiring board 24. A lid 38 is attached to the upper surface of the housing container 37.

For fixing the battery module 23, a thermal shrinkage tape may be used in place of an adhesive tape 22. In this case, after the protective sheets are disposed on each side surface of the battery module and a thermal shrinkage tape is wound, the thermal shrinkage tape is thermally shrunk, to bind the battery module.

In FIGS. 4 and 5, the single-batteries 21 are connected in series, but the single-batteries 21 may be connected in parallel in order to increase the battery capacity. Further, the assembled battery packs can also be connected in series and/or parallel.

Moreover, the mode of the battery pack according to the second embodiment is appropriately changed depending on the application. A preferable application of the battery pack according to the second embodiment is one where favorable cycle performance is desired along with favorable large current performance. Specific examples of the applications include that for a power source of a digital camera, and for use in a vehicle such as a two-wheeled or four-wheeled hybrid electric car, a two-wheeled or four-wheeled electric automobile, and a power-assisted bicycle. In particular, the battery pack according to the second embodiment is favorable for onboard use.

Since the battery pack according to the second embodiment is provided with the nonaqueous electrolyte battery according to the first embodiment, it is possible to reduce the gas generation amount within the battery, and it is thus possible to provide a battery pack which is high in output, excellent in life performance, and hardly swells.

EXAMPLES

Hereinafter, the above embodiments will be described in more detail based on examples. Examples will be described, but the examples described below are not restrictive as long as the scope of the present invention is not exceeded.

Example 1

Preparation of Positive Electrode 96 wt % of spinel type lithium manganese oxide powder represented by the general formula $LiM_xMn_{2-x}O_4$ (M is Al, x is 0.3 and 2-x is 1.7) and 4 wt % of lithium cobalt oxide ($LiCoO_2$) powder as positive electrode active material, acetylene black and graphite as electro-conductive agent, and polyvinylidene fluoride (PVdF) as binder were prepared. Since a weight ratio A of the spinel type lithium-manganese composite oxide in the positive electrode active material is 96 (wt %) and a weight ratio B of lithium cobalt oxide in the positive electrode active material is 4 (wt %), B/(A+B) is 0.04. The spinel type lithium manganese oxide powder contained secondary particles, the average particle size (secondary particle size) of the secondary particles was 11 μm, and the specific surface area obtained by the BET method with $N_2$ adsorption was 0.5 m$^2$/g. On the other hand, in the lithium cobalt oxide powder, the average particle size (primary particle size) of the primary particles was 10.5 μm, and the specific surface area obtained by the BET method with $N_2$ adsorption was 0.25 m$^2$/g.

3 parts by weight of acetylene black and 3 parts by weight of graphite were added to 90 parts by weight of the positive electrode active material and mixed with a Henschel mixer to prepare a mixed positive electrode active material. Next, 4 parts by weight of PVdF and N-methyl pyrrolidone (NMP) at a set ratio were added to the mixed positive electrode active material and kneaded with a planetary mixer to form a slurry. This slurry was coated onto each surface of a current collector made of aluminum foil having a thickness of 15 μm, dried at 120° C., and further press molded to prepare a positive electrode in which a positive electrode material layer was formed on each surface of the current collector.

<Preparation of Negative Electrode>

Spinel type lithium titanate ($Li_4Ti_5O_{12}$) powder having a lithium insertion and extraction potential of 1.55 V (vs. Li/Li$^+$) as negative electrode active material, acetylene black and graphite as electro-conductive agent, polyvinylidene fluoride (PVdF) as binder were prepared.

3 parts by weight of acetylene black and 3 parts by weight of graphite were added to 90 parts by weight of the negative electrode active material and mixed with a Henschel mixer to obtain a mixed negative electrode active material. Then, 4 parts by weight of PVdF and N-methyl pyrrolidone (NMP) at a set ratio were added to the mixed negative electrode active material and kneaded with a planetary mixer to form a slurry. This slurry was coated onto each surface of a current collector made of aluminum foil having a thickness of 15 μm, dried, and further press-molded to prepare a negative electrode in which a negative electrode material layer was formed on each surface of the current collector.

The pore specific surface area according to mercury porosimetry for each of the obtained positive electrode and negative electrode was measured by the above method, and the results are shown in Table 1.

<Preparation of Nonaqueous Electrolyte>

A nonaqueous electrolyte was prepared by mixing 1.0 M of $LiPF_6$ into a mixed solvent prepared by mixing ethylene carbonate (EC) and ethyl methyl carbonate (EMC) at a weight ratio of 1:2.

<Production of Electrode Group>

Plural negative electrodes and positive electrodes were alternately stacked with separator(s) made of a cellulose porous film having a thickness of 20 μm interposed therebetween to prepare an electrode group. The obtained electrode group was housed into a pack (container member) made of a laminate film having a thickness of 0.1 mm.

<Preparation of Nonaqueous Electrolyte Battery>

A nonaqueous electrolyte battery having a rated capacity of 500 mAh was prepared by pouring in the liquid nonaqueous electrolyte into the laminate film pack storing the electrode group and then completely sealing the pack by heat sealing. The prepared nonaqueous electrolyte battery was charged at 1 C in an environment at 25° C. to adjust a state of charge (SOC) to 90%, and the battery was then subjected to aging at 80° C. for 24 hours.

Example 2

A nonaqueous electrolyte battery was prepared in the same manner as in Example 1 except that B/(A+B) was changed to 0.01 by changing the positive electrode active materials spinel type lithium manganese oxide powder to 99 wt % and lithium cobalt oxide powder to 1 wt %, and the pore specific surface area according to mercury porosimetry and the C/D for each of the positive electrode and the negative electrode were changed as shown in Table 1 below.

Examples 3 to 5

A nonaqueous electrolyte battery was prepared in the same manner as in Example 1 except that the pore specific surface area according to mercury porosimetry and C/D for each of the positive electrode and the negative electrode were changed as shown in Table 1 below.

Example 6

A nonaqueous electrolyte battery was prepared in the same manner as in Example 1 except that, instead of spinel type lithium titanate, orthorhombic $Li_2Na_2Ti_6O_{14}$ (lithium insertion and extraction potential of 1.3 V (vs. $Li/Li^+$)) was used as negative electrode active material, and the pore specific surface area according to mercury porosimetry and C/D for each of the positive electrode and the negative electrode were changed as shown in Table 1 below.

Comparative Example 1

A nonaqueous electrolyte battery was prepared in the same manner as in Example 1 except that B/(A+B) was changed to 0.2 by changing the positive electrode active materials spinel type lithium manganese oxide powder to 80 wt % and lithium cobalt oxide powder to 20 wt %, and the pore specific surface area according to mercury porosimetry and the C/D for each of the positive electrode and the negative electrode were changed as shown in Table 1 below.

Comparative Example 2

A nonaqueous electrolyte battery was prepared in the same manner as in Example 1 except that B/(A+B) was changed to 0.1 by changing the positive electrode active materials spinel type lithium manganese oxide powder to 90 wt % and lithium cobalt oxide powder to 10 wt %, and the pore specific surface area according to mercury porosimetry and the C/D for each of the positive electrode and the negative electrode were changed as shown in Table 1 below.

Comparative Example 3

A nonaqueous electrolyte battery was prepared in the same manner as in Example 1 except that only spinel type lithium manganese oxide powder was used as the positive electrode active material, and the pore specific surface area according to mercury porosimetry and the C/D for each of the positive electrode and the negative electrode were changed as shown in Table 1 below.

Comparative Example 4

A nonaqueous electrolyte battery was prepared in the same manner as in Example 1 except that only lithium cobalt oxide powder was used as the positive electrode active material, and the pore specific surface area according to mercury porosimetry and the C/D of each of the positive electrode and the negative electrode were changed as shown in Table 1 below.

Comparative Example 5

A nonaqueous electrolyte battery was prepared in the same manner as in Example 1 except that B/(A+B) was changed to 0.04 by changing the positive electrode active materials spinel type lithium manganese oxide powder to 96 wt % and lithium cobalt oxide powder to 4 wt %, and the pore specific surface area according to mercury porosimetry and the C/D for each of the positive electrode and the negative electrode were changed as shown in Table 1 below.

After initial charge and discharge for each obtained battery, each battery was charged such that state of charge (SOC) was 100% and the battery voltage was 2.8 V, specifically each battery was subjected to constant current-constant voltage charging of 500 mA and 2.8 V until a current value became 25 mA, and then stored at 65° C. for 80 days. Thereafter, a recovered capacity retention ratio and a gas generation amount were measured by the following methods, and the results are shown in Table 1.

The battery taken out from the constant temperature bath at 65° C. was allowed to cool to room temperature, discharged to 1.8 V at 500 mA (1 C) in a constant temperature bath at 25° C., and then paused for 10 minutes. Subsequently, the battery was subjected to constant current-constant voltage charging of 1 C and 2.8 V until a current value became 25 mA, and then paused for 10 minutes. Thereafter, the discharge capacity obtained at the time of discharge to 1.8 V at 1 C is taken as recovered capacity. A ratio with respect to the capacity measured in the same manner before testing is taken as the recovered capacity retention ratio.

Each battery before testing was submerged in a rectangular parallelepiped graduated container containing water, and the volume is read from the position change of the water surface. Similarly, the volume of each battery after testing is read, and the change from the voltage before testing is taken as the gas generation amount.

TABLE 1

|  | B/(A + B) | C/D | C Pore specific surface area of positive electrode ($m^2/g$) | D Pore specific surface area of negative electrode ($m^2/g$) | Gas generation amount [mL] | Recovered capacity retention ratio [%] |
|---|---|---|---|---|---|---|
| Comparative Example 1 | 0.2 | 0.40 | 2.18 | 5.45 | 12.0 | 77.0 |
| Comparative Example 2 | 0.1 | 0.41 | 2.23 | 5.45 | 7.4 | 84.4 |
| Example 1 | 0.04 | 0.42 | 2.29 | 5.45 | 2.2 | 97.5 |
| Example 2 | 0.01 | 0.43 | 2.37 | 5.45 | 7.1 | 93.9 |
| Example 3 | 0.04 | 0.30 | 1.64 | 5.45 | 4.3 | 93.4 |

TABLE 1-continued

|  | B/(A + B) | C/D | C Pore specific surface area of positive electrode (m²/g) | D Pore specific surface area of negative electrode (m²/g) | Gas generation amount [mL] | Recovered capacity retention ratio [%] |
|---|---|---|---|---|---|---|
| Example 4 | 0.04 | 0.50 | 2.73 | 5.45 | 4.9 | 91.4 |
| Example 5 | 0.04 | 0.80 | 4.36 | 5.45 | 6.2 | 86.9 |
| Example 6 | 0.04 | 0.70 | 2.36 | 3.39 | 3.5 | 87.2 |
| Comparative Example 3 | 0 | 0.44 | 2.41 | 5.45 | 28.3 | 79.3 |
| Comparative Example 4 | 1.0 | 0.23 | 1.28 | 5.45 | >50 | — |
| Comparative Example 5 | 0.04 | 0.88 | 4.80 | 5.45 | 7.5 | 80.9 |

Comparison of Examples 1, 3 to 6 and Comparative Example 5 in which the value of B/(A+B) is 0.04 in Table 1 shows that in Examples 1 and 3 to 6 in which the value of C/D is 0.3 or greater and 0.8 or less, the battery has an excellent recovered capacity retention ratio, while the amount of gas generated due to high-temperature storage is less than that in Comparative Example 5. Among the examples, according to Examples 1 to 4 in which the value of C/D is 0.3 or greater and 0.5 or less, a high recovered capacity retention ratio can be obtained. According to Examples 1 and 3 to 6 in which the value of B/(A+B) is 0.03 or greater and less than 0.05, the gas generation amount is small. In the battery of Comparative Example 4 not using spinel type lithium manganese oxide, the amount of gas generated due to high-temperature storage was remarkably large, and there was concern of gas ejection during the test, so the test was terminated partway. Further, as shown in the results of Comparative Examples 1 to 3, when the value of B/(A+B) is less than 0.01 or 0.05 or greater, the gas generation amount at a high-temperature storage becomes greater than those in Examples 1 to 6.

Example 7

Spinel type lithium manganese oxide powder containing secondary particles, having an average secondary particle size of 5 μm, and having a specific surface area of 0.8 m²/g obtained by the BET method with N₂ adsorption was prepared as the spinel type lithium manganese oxide powder. Except that the spinel type lithium manganese oxide powder was used and B/(A+B), as well as the pore specific surface area according to mercury porosimetry and C/D for the positive electrode and the negative electrode were changed as shown in the following Table 2, a nonaqueous electrolyte battery was prepared in the same manner as in Example 1.

Example 8

Spinel type lithium manganese oxide powder containing secondary particles, having an average secondary particle size of 8 μm and having a specific surface area of 0.6 m²/g obtained by the BET method with N₂ adsorption was prepared as the spinel type lithium manganese oxide powder. Except that the spinel type lithium manganese oxide powder was used and B/(A+B), as well as the pore specific surface area according to mercury porosimetry and C/D for the positive electrode and the negative electrode were changed as shown in the following Table 2, a nonaqueous electrolyte battery was prepared in the same manner as in Example 1.

Example 9

Spinel type lithium manganese oxide powder containing secondary particles, having an average secondary particle size of 9 μm, and having a specific surface area of 0.55 m²/g obtained by the BET method with N₂ adsorption was prepared as the spinel type lithium manganese oxide powder. Except that the spinel type lithium manganese oxide powder was used and B/(A+B), as well as the pore specific surface area according to mercury porosimetry and C/D for the positive electrode and the negative electrode were changed as shown in the following Table 2, a nonaqueous electrolyte battery was prepared in the same manner as in Example 1.

After initial charge and discharge of each obtained battery, each battery was charged such that the SOC was 100% and the battery voltage was 2.8 V, and then stored at 65° C. for 80 days. Thereafter, the recovered capacity retention ratio and the gas generation amount were measured in the same manner as in Example 1, and the results are shown in Table 2.

TABLE 2

|  | B/(A + B) | C/D | C Pore specific surface area of positive electrode (m²/g) | D Pore specific surface area of negative electrode (m²/g) | Gas generation amount (mL) | Recovered capacity retention ratio (%) |
|---|---|---|---|---|---|---|
| Example 7 | 0.04 | 0.47 | 2.56 | 5.45 | 1.8 | 98.5 |
| Example 8 | 0.04 | 0.44 | 2.38 | 5.45 | 2.0 | 98.1 |
| Example 9 | 0.04 | 0.43 | 2.35 | 5.45 | 2.0 | 97.9 |

Comparison between Example 1 and Examples 7 to 9 shows that in Examples 7 to 9 where the spinel type lithium manganese oxide powder has an average secondary particle size of less than 10 μm and a specific surface area of greater than 0.4 m²/g as obtained by the BET method with N₂ adsorption, the gas generation amount is small and the recovered capacity retention ratio is higher as compared with Example 1 in which the spinel type lithium manganese oxide powder has an average secondary particle size of 10 μm or greater.

By performing aging treatment with conditions like that shown in the examples, lithium cobalt oxide is activated and the buffering action of lithium cobalt oxide is easily exerted. In addition, since a film of a certain degree is formed by a side reaction generated on the negative electrode, it is possible to inhibit subsequent side reactions. It is desirable to set the aging temperature in the range of 70° C. or higher and 90° C. or lower. Further, it is desirable to perform aging treatment on batteries at an SOC of 70% or higher and 90% or lower.

The nonaqueous electrolyte battery according to at least one of the embodiments and examples described above includes a positive electrode containing a spinel type lithium-manganese composite oxide and lithium cobalt oxide as an active material, a negative electrode containing a titanium-containing oxide as an active material, and also satisfies the formulas (1) and (2), so that it is possible to reduce the gas generation amount in the battery, and to obtain excellent high-temperature storage performance, as well.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A nonaqueous electrolyte battery comprising:
   a positive electrode, the positive electrode comprising a spinel type lithium-manganese composite oxide and a lithium cobalt oxide as a positive electrode active material, the spinel type lithium-manganese composite oxide and the lithium cobalt oxide satisfying formula (1) below;
   a negative electrode, the negative electrode comprising a titanium-containing oxide; and
   a nonaqueous electrolyte,
   the nonaqueous electrolyte battery satisfying formula (2) below:

$$0.01 \leq B/(A+B) < 0.05 \quad (1)$$

$$0.3 \leq C/D \leq 0.8 \quad (2)$$

where A is a weight ratio (wt %) of the spinel type lithium-manganese composite oxide in the positive electrode active material, B is a weight ratio (wt %) of the lithium cobalt oxide in the positive electrode active material, C is a pore specific surface area (m²/g) of the positive electrode according to mercury porosimetry, and D is a pore specific surface area (m²/g) of the negative electrode according to mercury porosimetry and a value of the D is within a range of from 5 m²/g to 5.45 m²/g.

2. The nonaqueous electrolyte battery according to claim 1, wherein the spinel type lithium-manganese composite oxide is represented by a general formula $LiM_xMn_{2-x}O_4$, where M is at least one element selected from the roup consisting of Mg, Ti, Cr, Fe, Co, Zn, Al, Li and Ga, and x satisfies $0.22 \leq x \leq 0.7$.

3. The nonaqueous electrolyte battery according to claim 1, wherein the C/D is within a range of from 0.3 to 0.5.

4. The nonaqueous electrolyte battery according to claim 1, wherein particles of the spinel type lithium-manganese composite oxide comprise secondary particles.

5. The nonaqueous electrolyte battery according to claim 4, wherein an average secondary particle size of the particles of the spinel type lithium-manganese composite oxide is from 4 μm to 15 μm.

6. The nonaqueous electrolyte battery according to claim 4, wherein an average secondary particle size of the particles of the spinel type lithium-manganese composite oxide is 4 μm or greater and less than 10 μm.

7. The nonaqueous electrolyte battery according to claim 1, wherein a specific surface area of the particles of the spinel type lithium-manganese composite oxide, according to a BET method with N₂ adsorption, is from 0.1 m²/g to 1.2 m²/g.

8. The nonaqueous electrolyte battery according to claim 1, wherein a specific surface area of the particles of the spinel type lithium-manganese composite oxide, according to a BET method with N₂, adsorption, is greater than 0.4 m²/g and 1.2 m²/g or less.

9. The nonaqueous electrolyte battery according to claim 6, wherein a specific surface area of the particles of the spinel type lithium-manganese composite oxide, according to a BET method with N₂ adsorption, is greater than 0.4 m²/g and 1.2 m²/g or less.

10. The nonaqueous electrolyte battery according to claim 1, wherein the titanium-containing oxide includes at least one selected from the group consisting of lithium-titanium composite oxide, anatase titanium-containing oxide, rutile titanium-containing oxide, bronze titanium-containing oxide, orthorhombic titanium-containing oxide, monoclinic niobium titanium-containing oxide, and a metal composite oxide containing Ti and at least one element selected from the group consisting of P, V, Sn, Cu, Ni, Nb, and Fe.

11. A battery pack comprising one or more of the non-aqueous electrolyte battery according to claim 1.

12. The nonaqueous electrolyte battery according to claim 1, wherein $$0.01 \leq B/(A+B) < 0.04 \quad (1), \text{ and}$$

$$0.3 \leq C/D \leq 0.8 \quad (2).$$

* * * * *